L. D. LOVEKIN.
METHOD OF SECURING BED PLATES TO SOLE PLATES.
APPLICATION FILED MAY 28, 1919.
1,344,416.
Patented June 22, 1920.
2 SHEETS—SHEET 1.
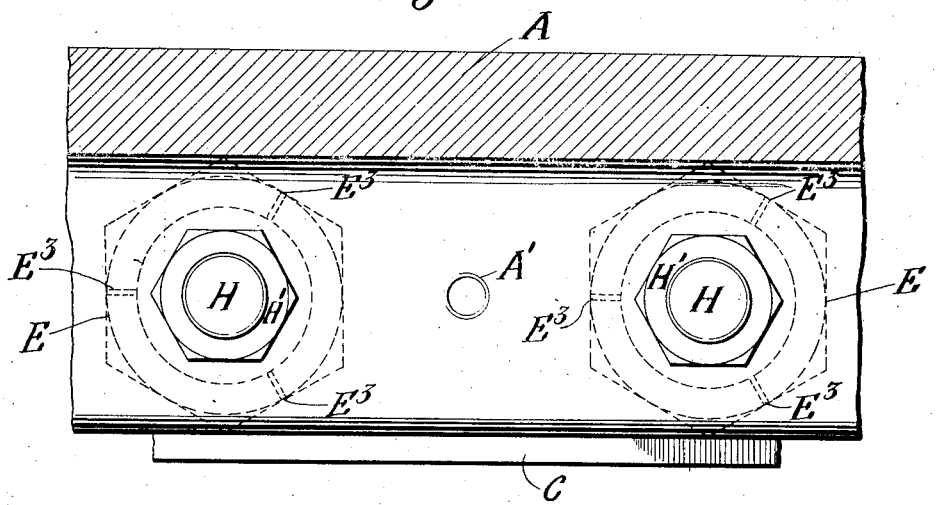
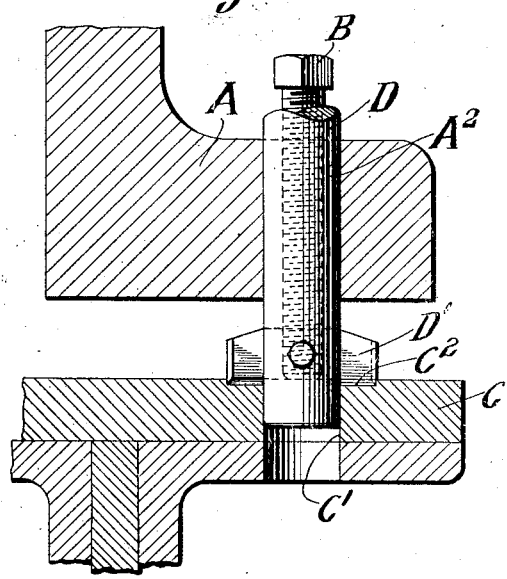
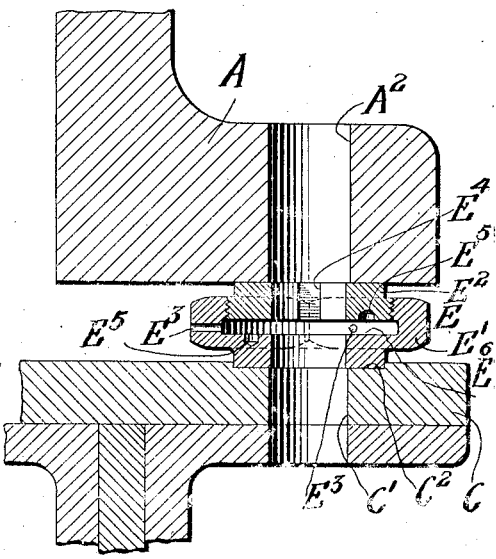
WITNESS.
Gustav Genzlinger
INVENTOR
Luther D. Lovekin
BY
Francis T. Chambers
ATTORNEY

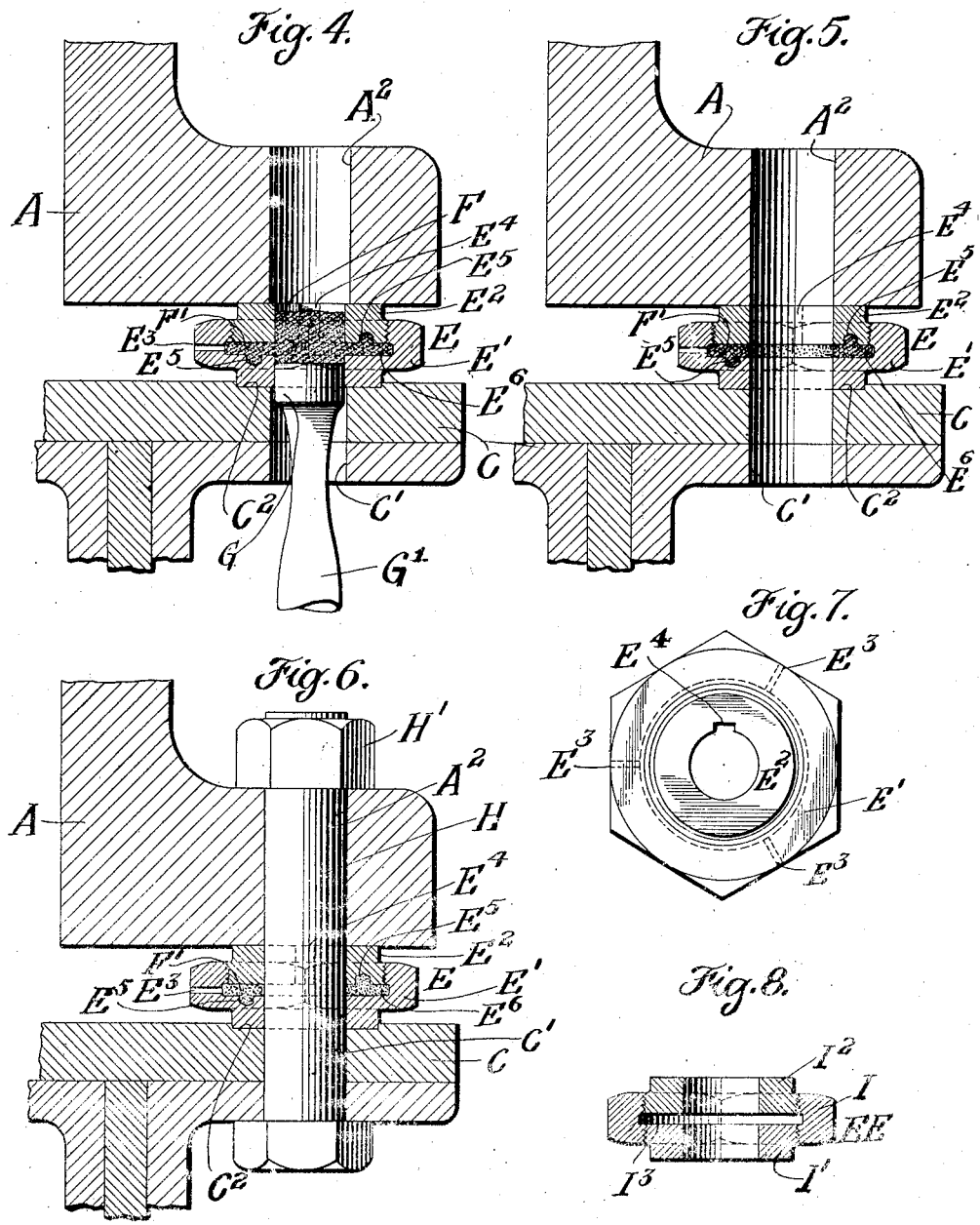

UNITED STATES PATENT OFFICE.

LUTHER D. LOVEKIN, OF ARDMORE, PENNSYLVANIA.

METHOD OF SECURING BED-PLATES TO SOLE-PLATES.

1,344,416.  Specification of Letters Patent.  Patented June 22, 1920.

Application filed May 28, 1919. Serial No. 300,471.

*To all whom it may concern:*

Be it known that I, LUTHER D. LOVEKIN, a citizen of the United States, and a resident of Ardmore, county of Montgomery, State of Pennsylvania, have invented a certain new and useful Improvement in Methods of Securing Bed-Plates to Sole-Plates, of which the following is a true and exact description, reference being had to the accompanying drawings, which form a part thereof.

My invention relates to a new method of securing bed plates of engines, and the like, to metallic sole or supporting plates, and is especially intended and adapted for use in installing the engines on ships, although obviously capable of many other uses.

Heretofore the method and appliances used in securing engines on sole plates provided to support them have involved great time and expense, and my object is to cut down the expenditure both of money and time, and, at the same time, secure the best possible alinement and anchorage of the engine. To this end my invention consists in the series of operations which will be best understood as described in connection with the drawings and which are hereinafter particularly pointed out in the claims.

In the drawings

Figure 1 is a plan view showing portions of the bed plate of an engine and of the sole plate supporting it secured together in the manner finally resulting from my constructive method.

Fig. 2 is a sectional elevation through one of the bolt holes showing a facing tool in use to face off the sole plate around the bolt hole.

Fig. 3 is a similar sectional view showing my expanding washer in place and expanded into contact with the bed plate.

Fig. 4 is a similar view showing my preferred method of filling the space between the washer sections with fusible metal.

Fig. 5 is a similar view showing the assembled parts after the reaming out of the bolt hole.

Fig. 6 is a similar view showing the completed structure with the holding down bolt in place.

Fig. 7 is a plan view of the expanding washer, and

Fig. 8 a sectional elevation of a modified form of expanding washer.

A indicates the bed plate of a ship's engine having in its outwardly extending flange threaded holes A' for use in connection with jack screws used in alining the bed plate, and bolt holes $A^2$ carefully alined at right angles to the under side of the flange for the holding down bolts. B, Fig. 2, indicates one of the jack screws, C indicates the supporting structure which I refer to generally as the sole plate, C' is the bolt hole in alinement with the hole $A^2$, and $C^2$ a portion of the face of the sole plate faced off around the bolt hole parallel to the lower face of the bed plate, D is the shaft of a facing tool fitting in bolt hole $A^2$ and carrying the facing tool D'. E is an expanding washer consisting of the internally threaded part E' and externally threaded part $E^2$ screwing into it, the portion E' having a portion $E^6$ which extends beneath and preferably parallel to the lower surface of the part $E^2$. $E^3$, $E^3$ are vent holes extending through the walls of the part E' into the space between the parts E' and $E^2$. $E^5$ indicates a recess formed in the opposing faces of E' and $E^2$, of which recesses there may be any desired number. $E^4$ is a vertical slot formed in the inner face of washer part $E^2$ to engage with a tool to be used in turning it to expand the washer. F, Fig. 4, is a plug of fusible metal poured in through bolt hole $A^2$ and filling the spaces between the washer parts, as shown at F'. G, Fig. 4, is a wooden plug having a handle G' by which it is inserted through bolt hole C' to hold the fused metal when poured into the washer. H is a holding down bolt and H' its nut. EE, Fig. 8, is a modified form of washer made up as shown of an internally right and left threaded part I, and two parts I' and $I^2$, screwing into it, as shown.

My method of securing the engine bed plate upon the sole plate consists in first properly spacing and alining the bed plate A above the sole plate C, in doing which the jack screws B are usefully employed. Bolt holes $A^2$ for the holding down bolts are formed in the flange of the bed plate perpendicular to the under face of said flange, and such bolt holes are continued through the sole plate as shown at C', said holes being slightly smaller than their intended final diameter. The engine bed plate being in proper position the next step is to face off the sole plate around the bolt holes C', as shown at $C^2$, so as to insure a washer supporting surface parallel to the under face of the bed plate, and this is conveniently done, as shown in Fig. 2, by a facing tool D', secured to a shaft D, fitting in bolt holes A² and C'. I next place the washers E in position on the faced off portion C², and expand them into supporting contact with the bed plate by screwing up the member E², which can conveniently be done by a tool passing through hole A² and having a finger engaging the slot E⁴. The washer having been expanded to its desired position, I next fill the space between the sections E' and E² with fusible metal. This is most conveniently done, as shown in Fig. 4, by inserting a wooden plug G in the lower part of the washer section E' and pouring fluid metal through the hole A², so that it partly fills the central hole in section E² and flows into the space between the washers, as shown at F', filling this space and the recesses E⁵. The vent holes E³ permit the escape of air and insure the filling of the space between the washer sections. I next ream out the bolt hole, as shown in Fig. 5, to form a body fit for the holding down bolt H, which I insert as shown in Fig. 6 and secure by nut H'. It will be obvious that an expanding washer, made as shown in Fig. 8, can be used instead of the washer E. My described method of securing bed plates and sole plates together involves less time and cost than methods now in use and also secures, I believe, an even better alinement and more secure assembling. The metal filling, or supplemental washer F, between the washer sections, not only locks the sections securely in their ultimate expanded position, but also reinforces the screw threads and connects the expanding washer into a practically solid supporting device.

The expanding washer hereinabove described forms the subject matter of my application for Letters Patent filed May 28, 1919, Serial No. 300,472.

Having now described my invention, what I claim as new and desire to secure by Letters Patent, is:

1. The method of securing bed plates to metallic sole plates, which consists in first alining the bed plate a distance above the sole plate, said bed plate having bolt holes for the holding down bolts, facing off the sole plate around the points through which holding down bolts are to pass to form washer seats, inserting an expanding washer in each of said seats, and expanding said washers to supporting contact with the sole plate, running fused metal into the space between the sections of the expanding washer, boring or reaming out bolt holes through the washer and sole plate in alinement with the bolt hole in the bed plate, and finally securing the bed plate and sole plate together by bolts passing through said bolt holes.

2. The method of securing bed plates to metallic sole plates, which consists in first alining the bed plate a distance above the sole plate, said bed plate having bolt holes for the holding down bolts, facing off the sole plate around the points through which holding down bolts are to pass to form washer seats, inserting an expanding washer in each of said seats, and expanding said washers to supporting contact with the sole plate, then closing the central opening through the bottom of the washer and pouring fused metal through the central washer opening at the top thereof to form a supplemental washer between the sections of the expanding washer, boring or reaming out bolt holes through the washer and sole plate in alinement with the bolt holes in the bed plate and finally securing the bed plate and sole plate together by holding down bolts passing through said bolt holes.

LUTHER D. LOVEKIN.